United States Patent [19]

Kemp, Jr.

[11] 4,365,707
[45] Dec. 28, 1982

[54] DEAD SHAFT BEARING FOR CONVEYORS

[76] Inventor: Dennis E. Kemp, Jr., P.O. Box 167, South Orange, N.J. 07079

[21] Appl. No.: 232,579

[22] Filed: Feb. 9, 1981

[51] Int. Cl.³ .............................................. B65G 33/32
[52] U.S. Cl. .............................. 198/672; 308/DIG. 4; 277/93 SD; 222/412
[58] Field of Search ....................... 222/410, 412, 413; 308/36.1, 36.5, 238, DIG. 4; 277/92, 93 R, 93 SD; 198/672; 403/288; 285/158

[56] References Cited

U.S. PATENT DOCUMENTS

| 1,794,326 | 2/1931 | Sierer | 222/413 |
| 2,382,122 | 8/1945 | Wiegand | 222/412 |
| 2,723,110 | 11/1955 | Collins | 308/36.1 |

FOREIGN PATENT DOCUMENTS 2626196 12/1977 Fed. Rep. of Germany ...... 198/672

Primary Examiner—H. Grant Skaggs
Attorney, Agent, or Firm—Mark T. Basseches; Paula T. Basseches

[57] ABSTRACT

The present invention is directed to a dead shaft bearing device for an auger type conveyor. The device is characterized in that the bearing components are readily replaceable without the necessity for disassembling the conveyor, and provide a leakproof assembly barring ingress of pulverulent material to the bearing surfaces and escape of pulverulent materials through the wall of the conveyor trough.

14 Claims, 3 Drawing Figures

DEAD SHAFT BEARING FOR CONVEYORS

BACKGROUND OF THE INVENTION

1. Field of the Invention

The present invention is in the field of auger type conveyors, and more particularly is directed to an improved dead shaft bearing assembly for an auger type conveyor. Although the dead shaft bearing assembly is anticipated to find its principal utility for use with auger type conveyors, the applicability of the device is not thus limited.

2. The Prior Art

A conventional auger conveyor assembly comprises a trough having an auger member rotatably disposed therein. One end of the auger, typically the end nearest the outfeed station, extends through an end wall of the trough and is connected to a drive mechanism normally including a gear train. The other end of the conveyor is rotatably supported in what is known in the trade as a "dead shaft bearing assembly."

Normally the infeed station is disposed in close proximity to the dead shaft bearing, with the result that pulverulent material deposited in the trough will heap over the shaft bearing. Where the substances processed by the auger are abrasive, or otherwise tend to contaminate the bearing, e.g. finely powdered zinc, sand, sugar, etc., the life of the dead shaft bearing may be extremely short, requiring frequent changes of the bearing. By way of example, where finely powdered zinc is fed, the life of the dead shaft bearing may be as short as 3½ hours, requiring frequent shutdown and replacement of the bearing assembly.

Two different types of dead shaft bearing assemblies have heretofore been employed.

In one type, a stub shaft projects into the interior of the trough through an end wall. The bearing surface cooperating with the shaft is provided by a bushing sleeved within the tubular pipe assembly on which the auger is mounted. When the bushing becomes worn, replacement thereof mandates removal of the stub shaft, disassembly of the drive connection at the power end of the auger, removal of the auger from the trough, extraction and replacement of the old bushing, and reassembly of the noted parts. The complexity of the described operation requires a substantial amount of down time of the auger. Also, any slight misalignment of the stub shaft accelerates bearing wear.

Despite the drawbacks of the dead shaft bearings of the first type described, they are in common use since they have the advantage that, since no rotating component of the auger assembly extends through the trough end wall, the pulverulent material cannot migrate through the wall.

In a further form of dead shaft bearing, the auger shaft extends through an aperture formed in an end wall of the trough. In such device, a stub shaft carried on a mounting mechanism outside the end wall of the trough extends through the trough and into a bushing disposed in the auger support pipe.

While bearings of the latter type have the advantage and removal and replacement of the bushing does not require disassembly of the auger mechanism, it has the substantial disadvantage that pulverulent materials may readily pass from the trough through the aperture provided for the rotating shaft and contaminate the work area.

There is nothing in either of the described dead shaft bearing constructions which limits ingress of the pulverulent material into the interface between the relatively moving parts. It will be appreciated that the bearing life is drastically reduced where the material is permitted to enter between the moving parts.

SUMMARY OF THE INVENTION

The present invention may be summarized as directed to a dead shaft bearing assembly especially useful in supporting the undriven shaft end of an auger type conveyor, characterized in that the bearing components may be readily changed without disassembly of the auger mechanism and by the fact that the bearing surfaces are protected against the ingress of pulverulent material, thereby greatly prolonging bearing life.

The device is further characterized in that positive protection is provided against the passage of pulverulent material outwardly through the trough and end wall and into the work area.

More particularly, in accordance with the dead shaft bearing assembly of the present invention, there is provided an auger support shaft having an inner end adapted to be mounted on the auger support pipe and a cylindrical bearing mounting cup at the other end extending through an aperture in the trough wall. An inner seal member of anti-friction material is mounted on the cup within the trough so as to rotate therewith, the inner seal having a surface in abutting relation to the inner wall of the trough. A back plate is secured to the outer wall of the trough in parallel spaced relation thereto. A stub shaft extends from the back plate into the interior of the cup, an anti-friction cylindrical bushing or bearing member being floatingly disposed between the stub shaft and cup to provide a primary bearing support.

The cup carries an elastomeric gland in frictional engagement with the cup, the gland in turn reacting against an anti-friction wiper disk biased by the gland against outer surfaces of the trough wall.

Preferably an annular collar is disposed between the back plate and the outer surface of the trough wall, defining a sealed chamber.

The above described arrangement provides a bearing assembly wherein the interface between the main bearing and the shaft is protected against the ingress of pulverulent material, yet enabling the bearing to be readily changed from the exterior of the auger feed assembly without the need for demounting the auger mechanism.

It is accordingly an object of the invention to provide an improved dead shaft assembly for auger feed or like devices.

A further object of the invention is the provision of a bearing assembly of the type described which is resistant to escape of pulverulent material through the trough wall, yet nonetheless permits replacement of the bearing parts without the requirement for demounting the auger.

Still a further object of the invention is the provision of a bearing device of the type described wherein the relatively moving bearing components are protected against the ingress of pulverulent material.

To attain these objects and such further objects as may appear herein or be hereinafter pointed out, reference is made to the accompanying drawings, forming a part hereof, in which.

Figure 1:
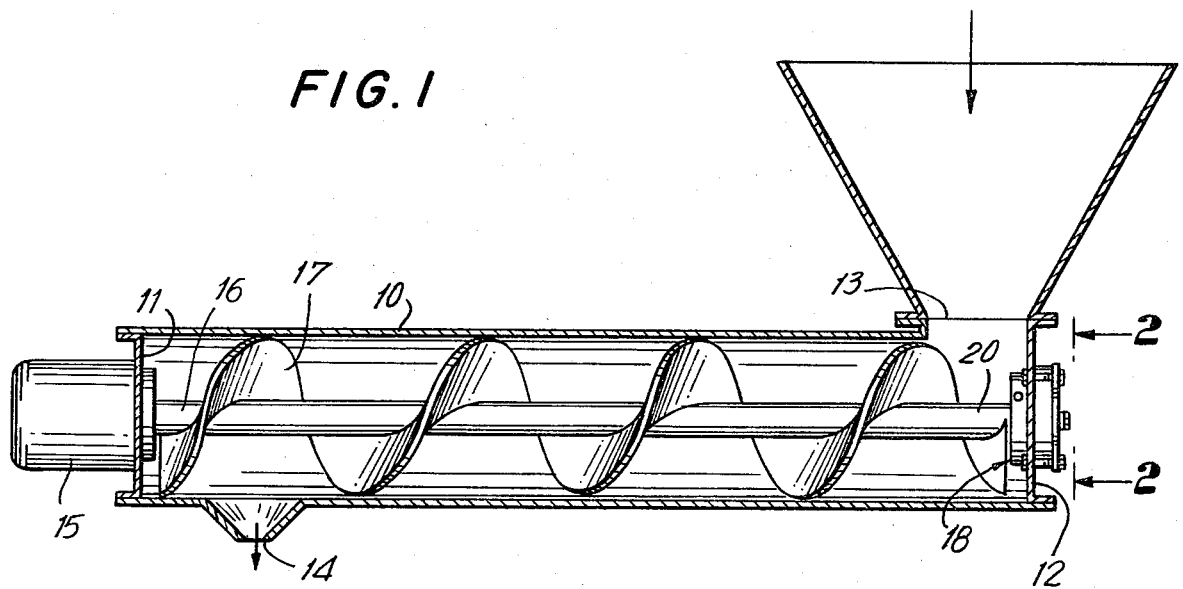
FIG. 1 is a vertical sectional view, partly diagrammatic in nature, through a typical auger feed assembly.
Figure 2:
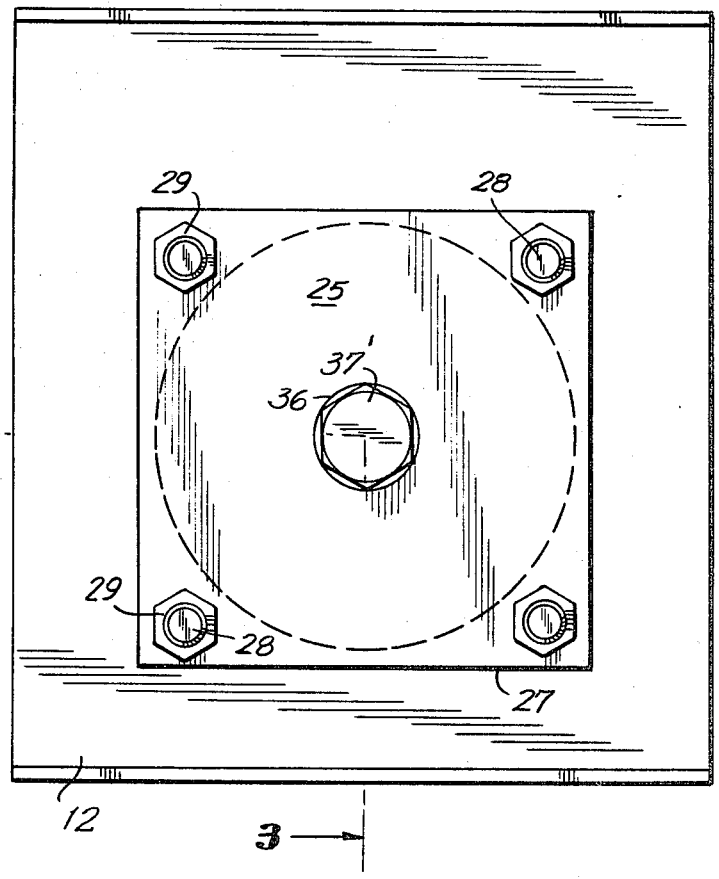
FIG. 2 is a magnified end elevational view taken in the direction of the arrows 2—2 of FIG. 1.
Figure 3:
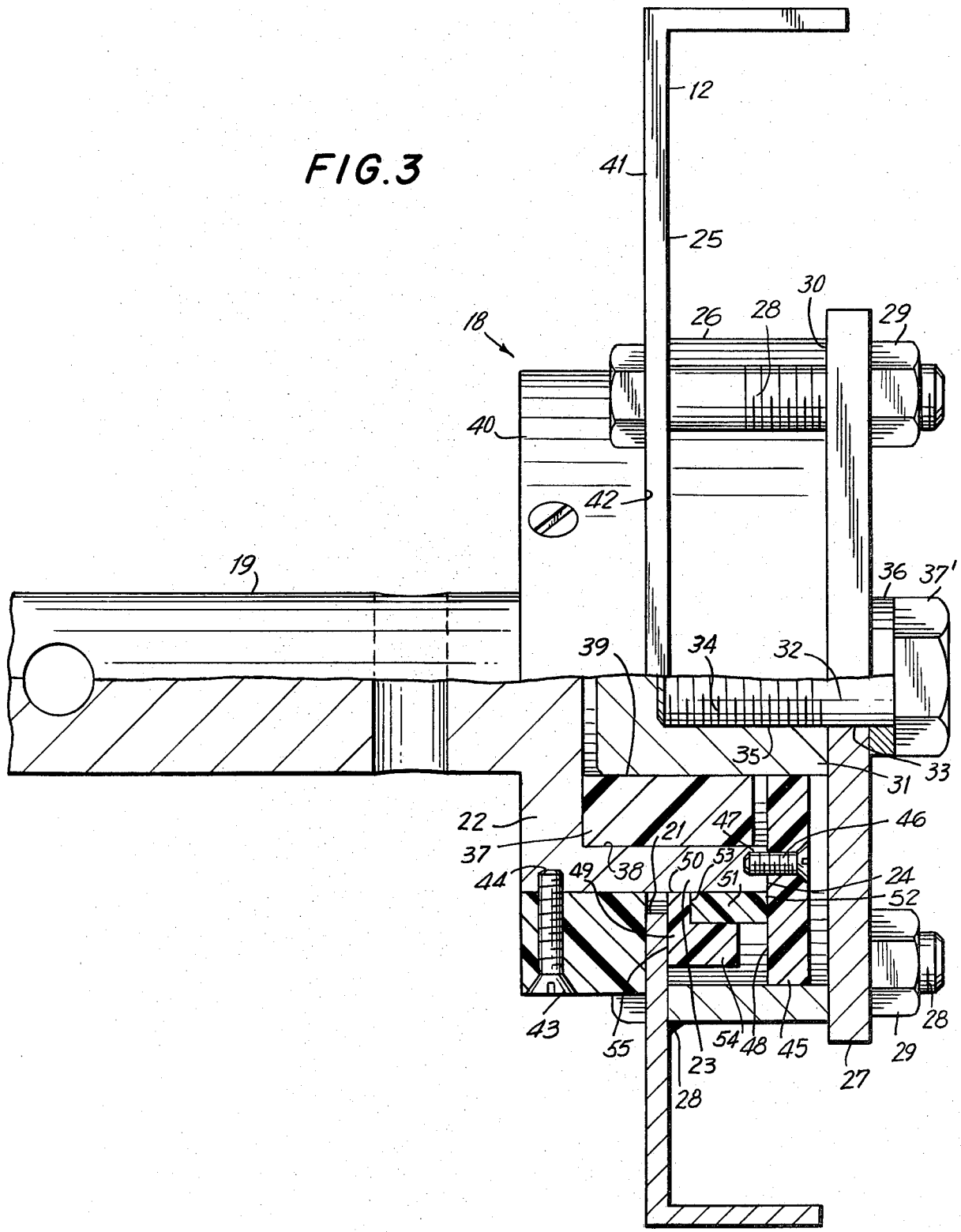
FIG. 3 is a further magnified sectional view through the dead shaft bearing assembly components taken on discontinuous section line 3—3 of FIG. 2.

Referring now to the drawings, there is shown in FIG. 1 a typical auger assembly including a trough 10 having a drive end wall 11, a dead shaft end wall 12, an infeed station 13, a discharge station 14 and a drive motor assembly 15 in driving connection with auger support pipe 16.

The pipe 16, which may be made up of one or more auger carrying separate pipe sections, depending upon the length of the auger, includes a flute or screw 17 which, as will be understood, when driven by motor 15 functions to advance material from the infeed station 13 to the discharge station 14.

Since typically the dead shaft bearing assembly 18 is located directly below the infeed station 13, the same is subject to amounts or heaps of pulverulent material to be fed, with the result that the bearing components of the prior art types hereinabove described are rapidly contaminated and compromised.

In accordance with the present invention, a durable, contamination-resistant, and readily renewable dead shaft bearing assembly is provided.

Preferably, but not necessarily, the dead shaft bearing assembly 18 may be formed integrally with trough end wall 12, although it will be understood that the bearing assembly may be supplied as a unit to be attached to existing trough end walls.

In accordance with the invention, the dead shaft assembly includes an auger support shaft 19 which fits within the end section 20 of the auger pipe 16 and is coupled to the pipe for conjoint rotation.

The trough end wall 12 has a circular aperture 21 formed therethrough, which aperture is sized to accommodate a bearing mounting cup 22 forming an integral outer end part of the auger support shaft 19. The mounting cup includes a hollow cylindrical body portion 23 and an open mouth portion 24. The cup 22 extends outwardly through aperture 21 into an annular chamber on the outer surface 25 of trough end wall 12, which chamber is defined by a cylindrical collar 26 and a back plate member 27. The collar 26 is preferably welded, as by annular weld 28, to the external surface 25 of the trough end wall 12.

The back plate 27 is provided with radially spaced apertures which align with mounting bolts 28, 28 extending outwardly through the end wall 12. Clamp nuts 29, 29 bear against the outer surface of the back plate 27 so as tightly to clamp the same against the edge portion 30 of the collar 26.

The dead shaft 31 is mounted on support bolt 32 extending through aperture 33 in the back plate 27. The threaded shank 34 of the bolt 32 is mounted in the complementally threaded bore 35 in the dead shaft 31, a lock washer 36 being interposed between the head 37' of bolt 32 and back plate 27 to maintain the parts in the desired threaded position.

A bushing 37, which is formed of a low friction bearing material such as bronze, nylon or a high density polymer, is mounted in the annular space defined between the inner bore 38 of the cup 22 and the outer peripheral or bearing surface 39 of the dead shaft 31.

The bushing 37 preferably floats in the noted annular space and is connected neither to the cup 22 nor the dead shaft 31.

An inner seal 40 in the form of an annulus, likewise of anti-friction material, preferably polymeric, is disposed adjacent the inner surface 41 of trough end wall 12. Preferably the trough wall adjacent surface 42 of the inner seal is disposed in abutment to and in wiping engagement against the inner surface 41 of the trough end wall.

The seal 40 is keyed to rotate with the shaft 19, as by machine screws 43 which extend radially through the seal 40 and into complemental tapped apertures 44 in the cup 22. Optionally, the surface of the seal 40 adjacent the inner face 41 of the trough end wall may include a resilient skirt (not shown) or like means whereby a light biasing and wiping action between the seal and the surface 41 is achieved.

A seal plate 45, which preferably is formed of anti-friction polymeric material or the like is secured in closing relation of the mouth or end surface 24 of the cup 22 as by machine screws 46 extending into tapped apertures 47 in the cup.

The plate 45, which preferably is circular in section and closely interfits with the interior surface of collar 26 includes a projecting portion 48 which extends radially beyond the outer diameter of the cup 22.

An annular wiper disk 49 includes a central aperture 50, axially slidably mounted over the cup member 22. The wiper disk 49 is formed of an anti-friction material of one of the types previously described.

An elastomeric annular gland member 51 is seated on the cylindrical portion of the cup 22, the inner diameter of the gland being tightly frictionally retained on the cup for rotation with the cup. The axial extent of the gland 51 is such that, in the assembled condition thereof, the gland is lightly compressed in an axial direction, i.e. the side portions 52, 53 of the gland react respectively against the seal plate 48 and the wiper disk 49.

It will thus be appreciated that by virtue of the engagement of the high friction gland 51 against wiper disk 49, the disk, upon rotation of the shaft 19, will be caused to rotate and be biased lightly against the outer surface 25 of the trough end wall 12 surrounding the aperture 21.

Preferably the wiper disk 49 includes a cylindrical extension 54 which overlies portions of the gland, whereby the gland is constricted within the space noted and the biasing pressure retained.

The operation of the device will be apparent from the preceding description.

When the shaft 19 is rotated, there occurs a relative rotation between the cup 22 and the dead shaft 31, the bushing or bearing member 37 providing a low friction support for such rotation.

The ingress of pulverulent material into the interior of the main bearing structure, i.e. between the dead shaft and bushing, is prevented by a plurality of relatively moving seal surfaces. More particularly, there is defined between the parts a labyrinth between the relatively moving surfaces, and specifically between surface 42 of the inner seal and surface 41 of the trough end wall, and between the surface 55 of the wiper disk 49 and inner surface 25 of the trough end wall.

A positive seal against the passage of pulverulent material is further provided by the intimate engagement of various surfaces of the gland 51 against portions of the wiper disk 49, the seal plate 45, and the external surface of the cup 22.

It will thus be perceived that passage of pulverulent material through the end wall 12, and particularly passage of the material to the interior main bearing surface, is positively prevented. Even if material should penetrate into the interior of the chamber defined between the trough end wall, the collar 26 and the back plate 27, it will be observed that such material cannot escape into the work space externally of the chamber.

When it becomes necessary, after extended use, to replacing the bushing 37 due to wear, it is merely necessary to remove back plate 27, remove the seal plate 45, and extract and replace the bushing. Such operation can be readily accomplished without demounting the auger assembly.

In similar fashion, should it be necessary to replace the dead shaft 31, this may readily be accomplished through removal of the dead shaft support bolt 32 with the back plate removed, as previously described.

From the foregoing description it will be observed that there is provided a dead shaft assembly for supporting the undriven end of an auger or like apparatus which is highly resistant to contamination, which permits facile removal and replacement of the main support bushing without demounting of the auger, and which provides a reliable closure against passage of the contents of the trough to the work space surrounding the trough.

As will be understood by those skilled in the art and familiarized with the instant disclosure, variations of constructional details, material selection and the like may be made without departing from the spirit of the invention.

Accordingly, the invention is to be broadly construed within the scope of the appended claims.

Having described the invention and illustrated its use, what is claimed as new and is desired to be secured by Letters Patent is:

1. A leakproof dead shaft bearing assembly for a screw conveyor or the like comprising a trough and wall having inner and outer surfaces and a throughgoing aperture, an auger support shaft having an auger attachment section at one end and a hollow cylindrical bearing mounting cup at the other, said cup extending through said aperture and having a mouth portion, a back plate mounted on said outer surface of said wall in parallel spaced relation thereto, a dead shaft section mounted on said back plate coaxially with said auger support shaft, said section extending into said cup through said mouth portion, an annular bushing member of anti-frictional material interposed between said cup and said dead shaft section, an annular wiper disk of anti-friction material surrounding and axially movably mounted on said cup, said disk including a seal surface abutting said outer surface of said end wall surrounding said aperture, and an annular elastomeric gland member having an inner diameter portion frictionally engaging and defining a seal surface with said cup, said gland member having a side surface biased against said wiper disk whereby said disk is rotatably coupled to said cup section and yieldably urged against said outer surface of said trough wall surrounding said aperture.

2. A bearing assembly in accordance with claim 1 and including an annular inner seal member of anti-friction material mounted on and keyed to rotate with said cup section, said inner seal member including a seal surface abutting said inner surface of said end wall.

3. A bearing assembly in accordance with claim 2 and including a collar member interposed between said outer surface of said end wall and said back plate and defining with said wall and back plate a sealed chamber.

4. A bearing assembly in accordance with claim 3 and including a seal plate member removably secured to said cup in covering relation of said mouth portion, said plate member including stop portions extending radially beyond said cup, said gland member having a side portion opposite said wiper disk reacting against said stop portions.

5. A bearing assembly in accordance with claim 4 wherein said wiper disk includes an axially extending, radially inwardly directed retainer portion spaced from said cup, and the outer peripheral portion of said gland member bears against said retainer portion.

6. Apparatus in accordance with claim 5 and including mounting means removably connecting said back plate to said end wall.

7. Apparatus in accordance with claim 6 wherein said dead shaft section is removably mounted to said back plate.

8. Apparatus in accordance with claim 7 wherein said bushing member, said disk, said seal plate member, and said inner seal member are fabricated of anti-friction polymeric material.

9. A bearing assembly in accordance with claim 1 and including a seal plate member removably secured to said cup in covering relation of said mouth portion, said plate member including stop portions extending radially beyond said cup, said gland member having a side portion opposite said wiper disk reacting against said stop portions.

10. A renewable, leakproof dead shaft bearing assembly for a screw conveyor or the like comprising a trough end wall having inner and outer surfaces and an aperture formed therethrough, a tubular cylindrical collar member mounted on said outer surface of said end wall, said collar member being centrally located as respects said aperture, a back plate on said collar in spaced relation to said end wall, a cylindrical dead shaft extending from said back plate through said aperture, said shaft being concentrically located with respect to said collar, an auger support shaft having an auger attachment section at one end and a hollow, cylindrical cup section at the other end, said cup section extending through said end wall and having an open mouth portion facing said back plate, an annular inner seal member of anti-friction material surrounding said cup section and keyed to rotate therewith, said seal member including a seal surface abutting said inner surface of said end wall, an annular main bushing member of anti-friction material interposed between the exterior surface of said dead shaft and an inner surface of said cup section, said main bearing member being rotatable relative to both said surfaces, a seal plate of anti-friction material removably secured to said cup section in closing relation of said mouth, said plate including portions extending radially beyond said cup, a wiper disk of anti-friction material surrounding and axially movably mounted on said cup, said disk including a seal surface abutting said outer surface of said end wall, and an annular gland member of resilient, high friction material having an inner diameter portion frictionally engaging and defining a seal with said cup, said gland member being axially compressed between said plate and said wiper disk whereby said wiper disk is yieldably biased against said outer surface of said trough end wall, and coupled for rotation with said support shaft.

11. Apparatus in accordance with claim 10 wherein said back plate and collar define a seal chamber surrounding said aperture.

12. Apparatus in accordance with claim 11 wherein said wiper disk includes an axially extending, radially inwardly directed retainer portion spaced from said cup and the outer peripheral portion of said gland member bears against said retainer portion.

13. Apparatus in accordance with claim 11 wherein said back plate is removably mounted to said collar, and said dead shaft is removably mounted to said back plate.

14. Apparatus in accordance with claim 13 wherein said bushing member, said disk and said inner seal members are fabricated of anti-friction polymeric material.

* * * * *